Nov. 5, 1935.  G. H. PROBST  2,019,581
BOOK SUPPORTING APPARATUS
Filed March 29, 1934   3 Sheets-Sheet 1
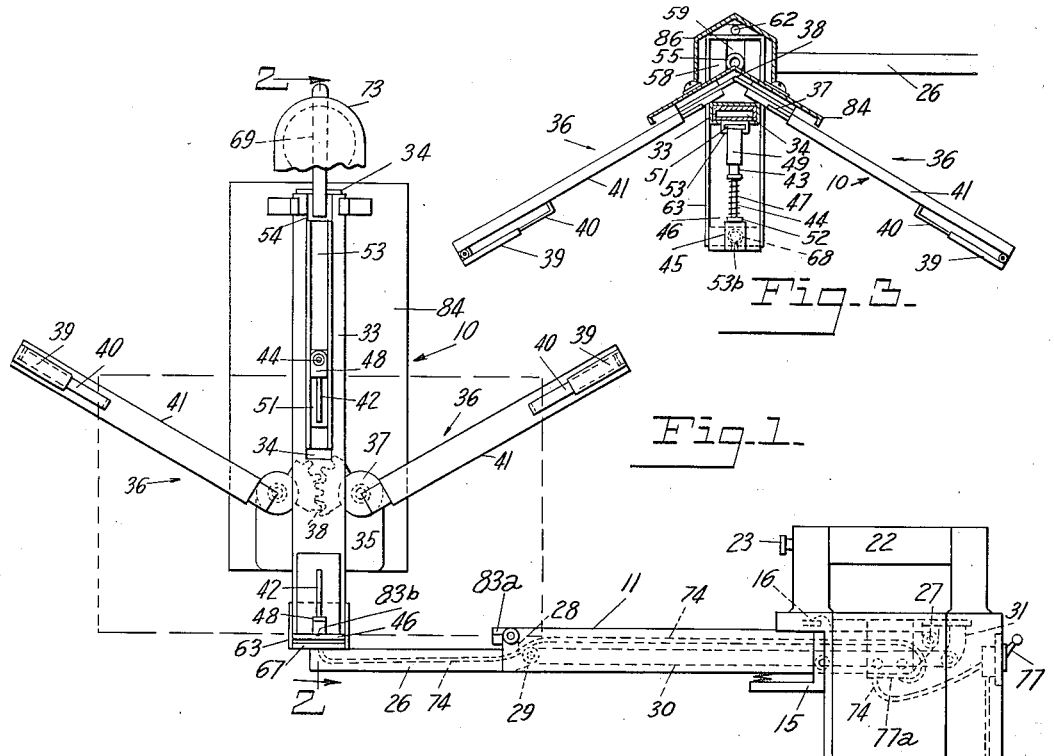
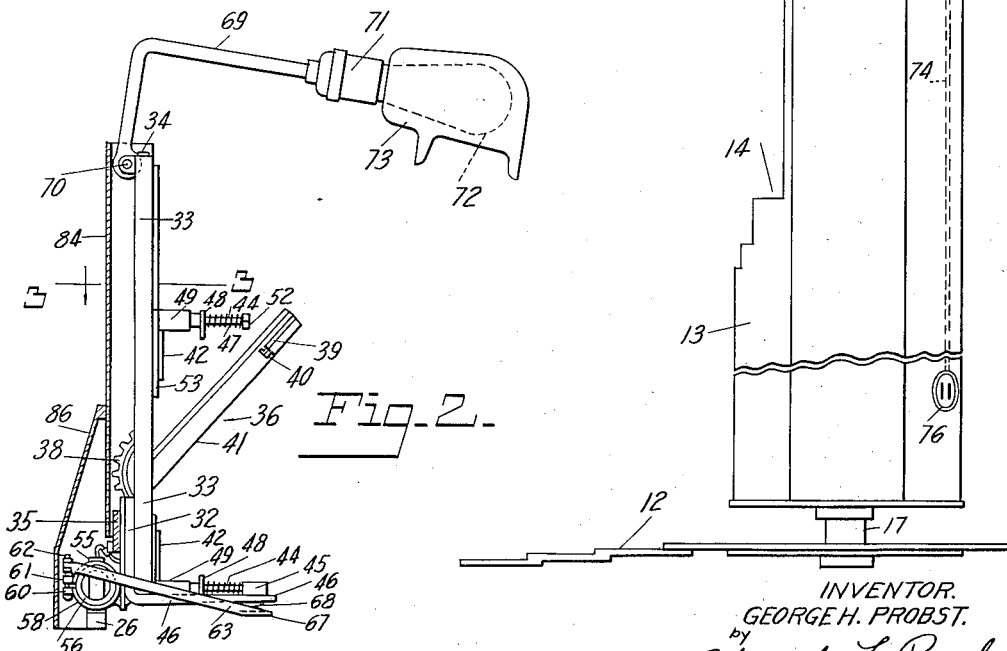
INVENTOR.
GEORGE H. PROBST.
by Edward L. Reed
his ATTORNEY.

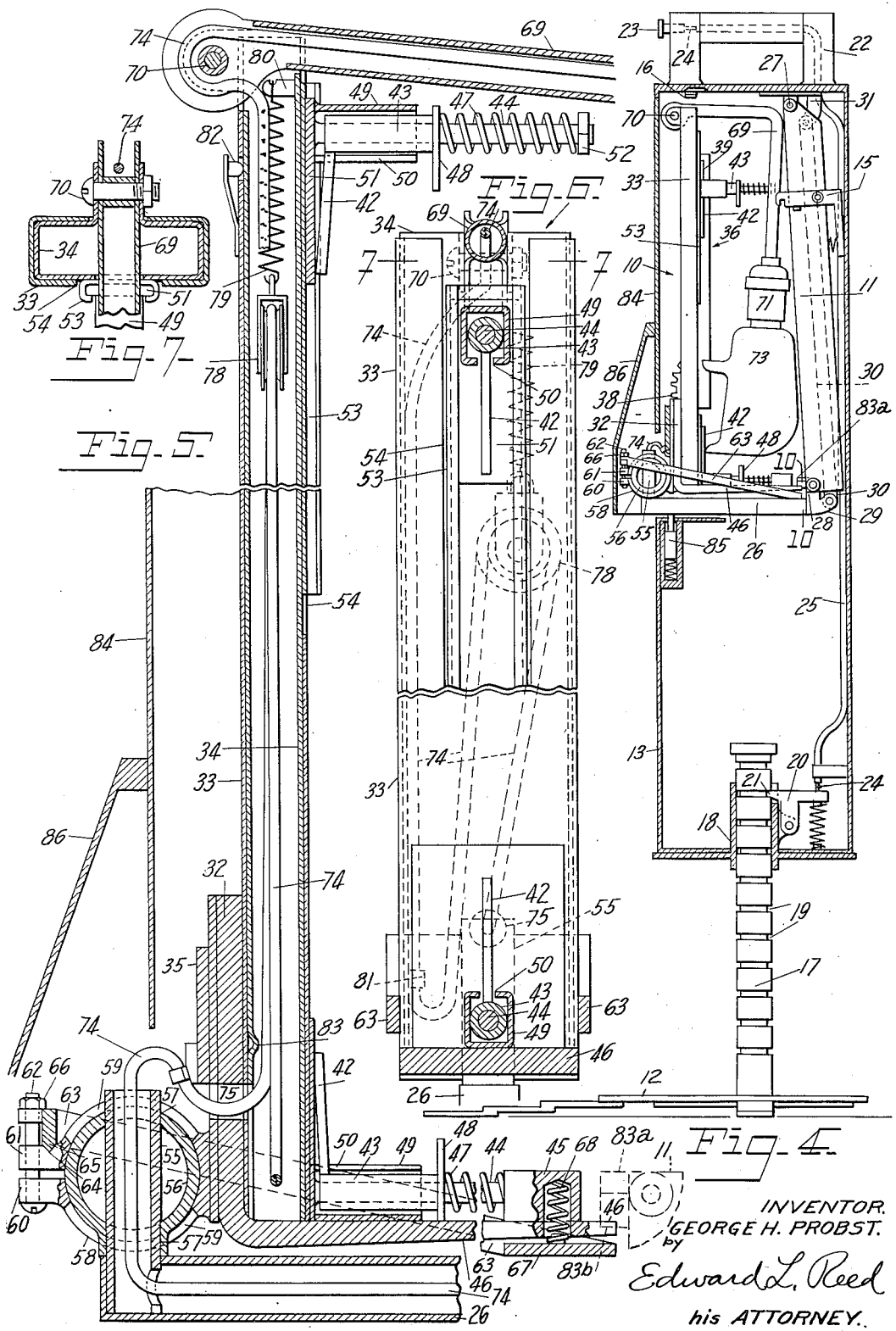

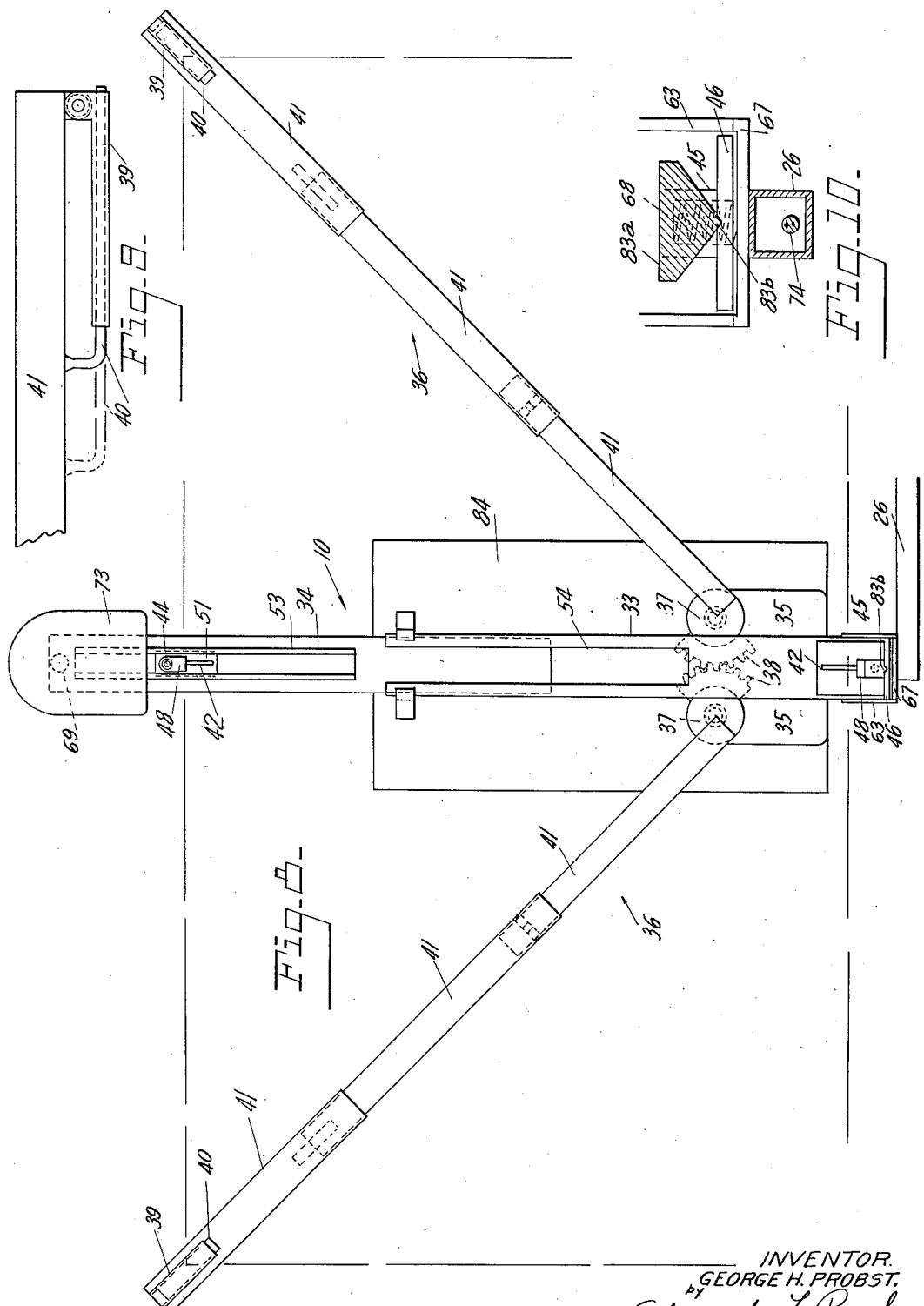

Patented Nov. 5, 1935

2,019,581

UNITED STATES PATENT OFFICE 2,019,581

BOOK SUPPORTING APPARATUS

George H. Probst, Marion, Ohio

Application March 29, 1934, Serial No. 717,931

26 Claims. (Cl. 45—60)

This invention relates to a book supporting apparatus. The main object of the invention is to provide apparatus for supporting a book, newspaper or the-like in proper reading position with relation to a person in a sitting or reclining position.

A further object of the invention is to provide an apparatus of this kind which may be moved toward or from the reader and which may be adjusted to any one of a plurality of positions to properly position the book or the like with relation to the reader.

A further object of the invention is to provide a book holder which may be readily adjusted to accommodate the same to either large or small reading matter, such as a book or a newspaper, and which can also be adjusted to so position the newspaper or the like that all parts of the reading matter will be spaced approximately uniform distances from the eyes of the reader.

A further object of the invention is to provide such an apparatus which can be folded into a compact form and, if desired, enclosed within the housing when not in use.

Other objects of the invention will appear as the apparatus is described in detail.

In the accompanying drawings Fig. 1 is a front elevation of an apparatus embodying my invention, showing the same in operative position and with the stand partly broken away; Fig. 2 is a vertical section through the book holder, taken on the line 2—2 of Fig. 1; Fig. 3 is a transverse sectional view of the book holder, taken on the line 3—3 of Fig. 2; Fig. 4 is a vertical sectional view of the apparatus showing the book holder folded into the housing; Fig. 5 is a vertical sectional view taken through the book holder and partly broken away, with the book holder facing the stand; Fig. 6 is a front elevation of the upright structure of the book holder, partly broken away and partly in section; Fig. 7 is a transverse section taken on the line 7—7 of Fig. 6; Fig. 8 is a front elevation of the book holder showing the same in its fully extended position; Fig. 9 is a detail view of one of the leaf engaging devices; and Fig. 10 is a section taken on the line 10—10 of Fig. 4.

In these drawings I have illustrated one embodiment of my invention and have shown the book holder, which is indicated as a whole by the reference numeral 10, as mounted upon a supporting structure, here shown as an arm 11, and which in turn may be mounted on any suitable support. Preferably the supporting structure or arm 11 is mounted for rotation about a vertical axis near one end thereof so that the book holder, which is supported on the other end thereof, may be moved toward or from the reader. In the particular construction illustrated the supporting structure is mounted upon a stand which comprises a base 12 and a housing 13 rotatably mounted on the base and having a portion of one side thereof cut away to provide an opening, as shown at 14. The supporting structure or arm 11 extends into the upper portion of this housing and is pivotally mounted therein near that side of the housing opposite the opening 14. A spring operated latch 15 carried by the arm engages a keeper 16 in the housing to support the arm in its horizontal position. The housing is also preferably vertically adjustable so as to locate the supporting structure 11, and consequently the book holder, at the proper elevation with relation to the reader, and, as here shown, the base 12 is provided with an upright standard 17 which extends through a bearing or sleeve 18 rigidly mounted in the bottom of the housing. This bearing has both sliding and rotary movement on the standard 17 and any suitable means may be provided for retaining the housing in its adjusted positions on the standard. As here shown, the standard is provided with a series of circumferential grooves 19 and a spring pressed latch 20 is mounted within the housing, preferably on the bearing 18, and is adapted to extend through a slot 21 in the bearing and enter any one of the grooves 19 in the standard. Any suitable means may be provided for actuating the latch to release the housing for vertical movement but this means is preferably located near the upper end of the housing and in the arrangement shown the housing has at its upper end a handle 22 by means of which it may be adjusted vertically on the standard or the apparatus as a whole lifted and carried from one place to another. Mounted in one end of this handle is a plunger or push rod 23 which is connected with one end of a wire 24 which extends through a sheath 25 and is connected at its lower end with the latch 20. Thus the plunger is so located that it can be engaged by the thumb of the hand which grasps the handle and pressed inwardly to move the latch to its inoperative position and to hold the same in that position while the housing is being adjusted.

The book support may be mounted on the supporting arm in any suitable manner but is preferably so connected therewith that it may be moved into the housing, through the opening 14, when the arm 11 is moved downwardly into a position parallel with the housing and within the same. In the present construction the book support has at its lower end a part or arm 26 extending laterally therefrom and pivotally connected with the supporting arm 11 so that in effect it forms an extension thereof but may be moved to a position at substantially right angles to the arm 11 when the latter is lowered, so that the book holder will remain in an upright position. Means are also provided for holding the book holder in an upright position during the movement of the same into and out of its folded position within the housing. As here shown, the arm 11 is tubular in form, being substantially rectangular in cross section, and is pivotally mounted at one end on a bracket arranged within the housing, as shown at 27. The part 26 projects into the other or outer end of the arm 11 and has an upwardly extending lug 28 which is pivotally mounted in the upper portion of the arm near the outer end thereof. This part 26 also has a pivot lug 29 with which is pivotally connected a supplemental arm 30 arranged within the tubular arm 11 and pivotally mounted at its inner end on a bracket 31 arranged within the housing, the arrangement being such as to provide substantially a parallelogram which will support the book holder against tilting movement as the arms of the parallelogram are moved about their axes.

The book holder comprises a main frame 32 on which is rigidly mounted an upright member 33. A second upright member 34 is slidably mounted upon the upright member 33 and is adapted to be projected above the same, thus enabling the length of the upright structure to be varied. In the present instance both members are tubular and the member 34 is mounted within the member 33. Mounted on the frame 32 on opposite sides of the upright member 33 are brackets 35 on which are mounted laterally extending arms 36 which are adjustable to various angular positions with relation to the upright member and which are here shown as pivotally mounted on the brackets 35, at 37. The two arms 36 may be connected one to the other so that they will move in unison and movement imparted to one arm will be transmitted to the other arm. To this end the two arms have rigidly connected therewith intermeshing toothed segments 38. Each arm 36 carries near its outer end a leaf engaging device 39 adapted to engage the leaves of the open book to retain the same in their open position. As here shown, these leaf engaging devices are in the form of yieldable clips pivotally mounted on the respective arms and provided with extensible portions 40 to enable them to engage leaves of different widths. It is also desirable that the arms 36 should be extensible to accommodate them to pages of different sizes, and they are here shown as made up of a plurality of tubular sections 41 arranged in telescoping relation and the leaf engaging devices are mounted on the outermost section which forms the outer end of the arm when the latter is extended. The sections may be held in their extended positions by friction or by detents, such as are commonly employed in telescoping devices of this kind.

Suitable devices are provided for engaging the upper and lower ends of the book to retain the same on the book holder and these devices preferably comprise narrow retaining members adapted to engage the book or newspaper at the hinge or fold therein so as to hold the book against outward movement without interfering with the turning of the pages. In the form shown in Figs. 5 and 6 the lower book retaining member comprises a finger 42 extending lengthwise of the upright member 33 and rigidly secured to a sleeve 43 which is slidably mounted on a rod 44, the inner end of which is rigidly secured to the stationary or lower upright member 33. The rod 44 of this lower retaining device is supported at its outer end in a block 45 which is rigidly secured to a forwardly extending member or plate 46 rigidly secured to and forming a part of the frame 32. A spring 47 is coiled about the rod 44 and confined between the block 45 and a part 48 which is secured to the outer end of the sleeve 43 and forms a finger piece by means of which the sleeve and finger 42 may be retracted to permit the book to be placed in position. A housing 49 is mounted on the plate 46 and extends about the sleeve 43 and is provided in its upper side with a slot 50 through which the finger 42 extends and which serves to guide the finger into proper engagement with the hinge of the book. This housing also serves as a detent to hold the finger in an inoperative position while the book is being placed in position. To this end the finger piece 48 is actuated to retract the sleeve and withdraw the finger from the slot 50 and then rotate the sleeve to move the finger out of line with the slot so that when released it will be moved by the spring into engagement with the end of the housing. After the book has been placed in position, with its lower end on the housing 49, the finger piece is again actuated to move the finger into line with the slot and the spring then moves the finger into engagement with the book. The book retaining device for the upper end of the book is similar to the one described but the finger 42 extends downwardly instead of upwardly and the rod 44 is rigidly secured to a slide plate 51 and its outer end is unsupported but is provided with a stop or nut 52 against which the spring 47 bears. The slide plate 51 which carries this upper book retaining device is slidably mounted in guideways 53 carried by the upper or movable upright member 34 and extending through a vertical slot 54 in the stationary upright member 33. The plate 51 fits within the guideways 53 with sufficient frictional contact to hold the same in adjusted positions. When the movable upright member is in its lower or collapsed position the guideways 53 will extend for substantially half the length of the stationary upright member and when the movable upright member is in its upper or extended position the guideways will be located entirely above the stationary member. In either position of the guideways the upper book retaining member may be adjusted for the full length of the guideways and thus may be caused to engage books or papers differing greatly in height.

When the upright members and the arms 36 are in their extended positions the book holder will support sheets of large size, such as a newspaper, and of course the device may be adjusted to various positions to accommodate it to books, magazines or papers of various sizes. In order that the pages of the book or paper may be supported approximately equal distances from the eyes of the reader it is preferable that the pages should extend forwardly from the upright member 33 and therefore I have shown the arms 36 as diverging forwardly from that member, see Fig. 3. It is also important that the book holder as a whole should be adjustable with relation to the supporting structure 11 to properly position the book or paper with relation to the reader. I have therefore so mounted the book holder on the part 26, which connects it with the supporting member, that it may be adjusted either about a vertical axis or a horizontal axis, thereby enabling it to be adjusted to the desired transverse position and then tilted about the horizontal axis so that the upper and lower parts of the paper will be approximately the same distances from the eyes of the reader, and the pages of the paper being supported in diverging planes all parts of the paper will be approximately the same distance from the eyes of the reader. Various connections may be interposed between the book holder and the supporting structure to provide for these adjustments but, in the construction here shown, the part 26 has rigidly mounted therein a vertical stud or pivot pin 55, which is preferably tubular, and a friction member, such as a horizontal cylinder or drum 56, is pivotally mounted on the stud for movement about a vertical axis. As here shown, the drum has openings 57 in its upper and lower sides which form bearings for the stud 55. Rigidly secured to the frame 32 and forming part of the book holder, is a friction element which cooperates with the drum 56 and which is preferably in the form of a split sleeve 58 having slots 59 to receive the stud 55. This split sleeve is provided at the edges thereof with apertured lugs 60 and 61 through which extends a pin or bolt 62, the head of the bolt engaging the lower side of the lower lug 60. Pivotally mounted on the upper lug 61 is an actuating lever 63 which, in this construction, has a knife edge 64 to engage a V-bearing 65 in the upper surface of the upper lug 61, between the bolt 62 and the sleeve 58. The lever extends rearwardly beyond the knife edge 64 and is apertured to receive the upper end of the bolt 62 and to engage beneath a nut 66 on the upper end of the bolt. Consequently downward movement on the forward end of the lever will tend to move the bolt and the lower lug 60 upwardly and to move the upper lug 61 downwardly and to thereby press the split sleeve tightly into engagement with the drum and to hold the book holder against movement about its horizontal axis. When the forward end of the lever is moved upwardly the pressure of the sleeve on the drum will be relieved and the book holder may be adjusted. Preferably the actuating lever 63 comprises two arms arranged on opposite sides of the plate 46 of the frame 42 and connected at their forward ends by a transverse plate 67, and a coiled spring 68 is interposed between the plate 67 of the lever and the plate 46 and tends to hold the friction device normally in its operative position. This arrangement provides a convenient means whereby the friction may be relieved by merely grasping the plate 46 and the end of the lever 63 and pressing the same one toward the other. In the present arrangement I have not found it necessary to provide any means for holding the drum against rotation about the stud 55 as the stud fits snugly in the bearings with sufficient friction to hold the book holder against free movement about the stud.

It is also desirable that the apparatus should be provided with a lamp and I have therefore shown a lamp supporting arm 69 as pivotally mounted on the movable upright member 34, at 70. This arm has at its outer end a lamp socket 71 to receive a lamp 72 which is preferably enclosed within a lamp shade or guard 73 to prevent the light from shining directly into the eyes of the reader or other persons facing the lamp. The arm 69 is of angular construction so that when it is moved downwardly about its axis the lamp will be supported parallel with but spaced a short distance from the upright structure of the book holder, as shown in Fig. 4. The conductor cord for the lamp, which is shown at 74, extends through the tubular arm 69, through the upright members 33 and 34, and through an opening 75 in the lower portions of the two upright members and the frame 32, the opening in the movable supporting member 34 being in the nature of a slot to permit that member to move with relation to the cord. The cord then extends through the tubular stud 55, part 26 and arm 11, into the housing 13, where it is connected with a suitable connector or socket 76. Preferably a switch 77 is interposed in the circuit and, as here shown, the switch is arranged in the upper portion of the housing and its actuating member is arranged exteriorly of the housing. Also, if desired, the conductor cord 74 may lead to a terminal block 77a in the upper portion of the housing 13 and other conductors may lead from the terminal block to the switch and from the switch to the connector 76. In order to permit of the extension of the movable upright member 34 that portion of the conductor cord within the upright members is provided with sufficient slack to permit of this movement of the member 34, and to prevent this slack from becoming tangled, or otherwise interfering with the extension of the upright structure, I have looped the same about a sheave 78 which is supported within the movable member 34 by a spring 79 which is connected at its upper end with a stud 80. The cord extends from the opening 75 above the sheave thence downwardly to a point near the lower end of the movable upright member where it is anchored by a clip, as shown at 81, and thence upwardly to the upper end of the movable upright member where it is passed in a broad loop about the axis of the lamp arm 69 and then into that arm, thus preventing any sharp bend in the conductor as it enters the arm 69. When the movable member is moved upwardly that portion of the conductor on one side of the sheave will be held against movement by its connection with the stationary member, and that portion of the conductor on the other side of the sheave will move upwardly with the movable member. The sheave will thus be held against upward movement and the upward movement of the movable member, to which the spring is attached, will stretch the spring and cause the same to exert an upward pull on the sheave, thus retaining the looped portion of the conductor taut. When the movable member is moved downwardly the tension on the spring will be relieved but it will always retain the sheave in position to maintain the loop taut. Ordinarily the frictional contact between the stationary and movable tubular members 33 and 34 may be sufficient to hold the member 34 in adjusted positions but when the spring 79 is employed in connection with the conductor supporting sheave it is desirable to provide some positive means for retaining the movable member in its elevated position and I have therefore shown a spring detent 82 mounted on the upper end of the stationary member 33 and adapted to engage one or more recesses 83 in the movable upright member.

When the apparatus is to be folded the movable upright 34 is moved to its lowermost position, the lamp arm is folded downward against the upright and the lateral arms 36 are collapsed and folded in positions parallel with and close to the upright. The book holder is then rotated about the stud 55 to move the plate 46 of the frame into position above and parallel with the part 26. Preferably the outer end of the supporting arm 11 is provided with a yieldable latch 83a to engage a shallow recess 83b in the upper surface of the plate and retain the book holder in this position, as shown in Figs. 4 and 5. The latch 15 is then actuated to release the supporting arm 11 which swings downwardly under the weight of the book holder, the latter remaining in an upright position while the arm moves from a horizontal to a vertical position and as the arm completes its swinging movement both the arm and the book holder will enter the housing, as shown in Fig. 4. A suitable closure plate may be provided for the opening in the housing and this plate is preferably secured to and moves with the book holder, as shown at 84, so that the opening in the housing is closed automatically when the book holder is folded within the housing. If desired, a detent 85 may be mounted in the lower portion of the housing to engage the part 26 and hold the same against outward movement. It is also desirable that the cover plate 84 have mounted thereon an outwardly extending part or supplemental housing 86 to enclose the connecting members 56 and 58 which project rearwardly beyond the frame member 32.

While I have shown and described one embodiment of my invention I wish it to be understood that I do not desire to be limited to the details thereof as various modifications may occur to a person skilled in the art. It will further be understood that the term "book" as herein used, is intended to include a book, magazine, newspaper or similar article.

Having now fully described my invention, what I claim as new and desire to secure by Letters Patent, is:

1. In a book supporting apparatus, a substantially horizontal supporting structure, a book holder having means for supporting a book in an open position, a connecting member mounted on said supporting structure for movement about a vertical axis, a second connecting member secured to said book holder and mounted on the first mentioned member for movement about a horizontal axis with relation thereto, said connecting members having opposed friction surfaces yieldably held in contact one with the other to support said book holder in an adjusted position, and an actuating device acting on one of said members to relieve the friction between the two members to permit the adjustment of said second member with relation to the first mentioned member.

2. In a book supporting apparatus, a substantially horizontal supporting structure, a book holder having means for supporting a book in an open position, a connecting member mounted on said supporting structure for movement about a vertical axis, a second connecting member secured to said book holder and mounted on the first mentioned member for movement about a horizontal axis with relation thereto, and means comprising an operable part extending forwardly from said book holder to control the relative movement of said members.

3. In a book supporting apparatus, a substantially horizontal supporting structure, a book holder having means for supporting a book in an open position, a connecting member mounted on said supporting structure for movement about a vertical axis and having a friction surface curved about a horizontal axis, and a second connecting member secured to said book holder and having a friction surface curved about a horizontal axis and engaging the first mentioned friction surface to support said book holder on the first mentioned connecting member for adjustment about a horizonal axis.

4. In a book supporting apparatus, a substantially horizontal book supporting structure, a book holder having means for supporting a book in an open position, a vertical stud carried by said supporting structure near one end thereof, a cylindrical member mounted on said stud for movement about an axis transverse to its cylindrical axis, and a sleeve secured to said book holder and mounted on said cylindrical member for movement about the cylindrical axis thereof and frictionally engaging said cylindrical member to retain said book holder in adjusted positions with relation thereto.

5. In a book supporting apparatus, a supporting structure, a book holder having means for supporting a book in an open position, a stud carried by said supporting structure, a cylindrical member mounted on said stud for movement about an axis transverse to its cylindrical axis, a split sleeve secured to said book holder at the back thereof, extending about said cylindrical member and adapted to frictionally engage the same, and operable means to control said frictional engagement comprising an operating part extending to the front of said book holder.

6. In a book supporting apparatus, a supporting structure, a book holder having means for supporting a book in an open position, a stud carried by said supporting structure, a cylindrical member mounted on said stud for movement about an axis transverse to its cylindrical axis, a split sleeve carried by said book holder, extending about said cylindrical member and adapted to frictionally engage the same, a rod connected with said sleeve near one edge thereof, a lever pivotally mounted on said sleeve near the other edge thereof and operatively connected with said rod, and a spring acting on said lever to move the edges of said sleeve one toward the other.

7. In a book supporting apparatus, an upright stand, a horizontal arm pivotally mounted on said stand for initial downward movement from its horizontal position to a position substantially parallel with said stand, operable means for retaining said arm in said horizontal position and for releasing the same for downward movement, a book holder, and means for supporting said book holder in an upright position on the outer portion of said arm when the latter is in said horizontal position and permitting said book holder to be moved to a position substantially parallel with said arm when the latter is in its lowered position.

8. In a book supporting apparatus, an upright stand, a horizontal arm pivotally mounted on said stand for downward movement from its horizontal position to a position substantially parallel with said stand, operable means for retaining said arm in said horizontal position and for releasing the same for downward movement, said arm having an outer portion hinged to the inner portion thereof for movement to a position transverse to said inner portion when said arm is moved to its lowered position, and a book holder carried by the outer portion of said arm.

9. In a book supporting apparatus, an upright stand, a horizontal arm pivotally mounted on said stand for downward movement from its horizontal position to a position substantially parallel with said stand, operable means for retaining said arm in said horizontal position and for releasing the same for downward movement, said arm having an outer portion hinged to the inner portion thereof for movement to a position transverse to said inner portion when said arm is moved to its lowered position, a book holder mounted in an upright position on said outer portion of said arm, and means controlled by the downward movement of said arm to move said outer portion thereof to said transverse position and thus move said book holder to a position adjacent to and substantially parallel with the inner portion of said arm.

10. In a book supporting apparatus, an upright stand, a horizontal arm pivotally mounted on said stand for downward movement from its horizontal position to a position substantially parallel with said stand, operable means for retaining said arm in said horizontal position and for releasing the same for downward movement, said arm having an outer portion hinged to the inner portion thereof for movement to a position transverse to said inner portion when said arm is moved to its lowered position, a link having one end pivotally mounted on said stand on an axis parallel with and spaced from the pivotal axis of said arm and having its other end pivotally connected with said outer portion of said arm on an axis parallel with and spaced from the axis of the hinged connection between the two parts of said arm, and a book holder carried by said outer portion of said arm.

11. In a book supporting apparatus, a stand, a laterally extending supporting structure pivotally mounted on said stand for movement into a position substantially parallel therewith, a book holder mounted in an upright position on said laterally extending structure and movable to a position substantially parallel with but spaced from said structure when the latter is parallel with said stand, and a lamp support pivotally mounted on said book holder for movement into the space between said book holder and said supporting structure.

12. In a book supporting apparatus, a stand comprising an upright housing having an opening in a side wall thereof, a supporting structure pivotally mounted at one end on said housing for swinging movement about a substantially horizontal axis toward and from said housing, a book holder and means for so mounting said book holder on said supporting structure that it may be moved laterally through said opening into said housing when said supporting structure is moved toward said housing.

13. In a book supporting structure, an upright housing having a vertically elongated opening in the side wall thereof, a supporting arm pivotally mounted on the upper portion of said housing for swinging movement about a substantially horizontal axis into and out of said housing, releasable means for retaining said arm in a substantially horizontal position, a book holder foldable to a width less than the width of said opening, and means for so mounting said book holder on said supporting arm that it will extend upwardly therefrom when said arm is in a horizontal position and may be moved to a position substantially parallel with said arm when the latter is moved into said housing, whereby the folded book holder will enter said housing along with said supporting arm.

14. In a book supporting structure, an upright housing having a vertically elongated opening in the side wall thereof, a supporting arm pivotally mounted on the upper portion of said housing for swinging movement about a substantially horizontal axis into and out of said housing, releasable means for retaining said arm in a substantially horizontal position, a book holder foldable to a width less than the width of said opening, means for so mounting said book holder on said supporting arm that it will extend upwardly therefrom when said arm is in a horizontal position and may be moved to a position substantially parallel with said arm when the latter is moved into said housing, and means controlled by the movement of said arm for causing said book holder to be moved to said parallel position as said arm moves toward said housing.

15. In a book supporting apparatus, an upright housing having a vertically elongated opening in the side wall thereof, a supporting structure pivotally mounted on said housing for swinging movement about a substantially horizontal axis to a substantially horizontal position or through said opening into said housing, a book holder comprising an upright member and laterally extending members foldable to positions adjacent to and substantially parallel with said upright member, said book holder when so folded being of a width less than the width of the opening in said housing, and means for so mounting said upright member on said supporting structure that the folded book holder may be moved to a position substantially parallel with said supporting structure and caused to enter said housing along with said supporting structure.

16. In a book supporting apparatus, an upright housing having an opening in a side wall thereof, a supporting structure pivotally mounted at one end on said housing for swinging movement about a substantially horizontal axis through said opening into and out of said housing, a book holder adapted to enter said housing through said opening, means for mounting said book holder on said supporting structure for movement into a position substantially parallel therewith and causing the same to be moved through said opening into said housing when said supporting structure is moved into said housing, and means for adjusting said book holder with relation to said supporting structure.

17. In a book supporting apparatus, a housing having an opening in one side thereof, a supporting structure mounted at one end on said housing for movement through said opening into and out of said housing, a book holder adapted to enter said housing through said opening, means for mounting said book holder on said supporting structure in such a manner that it may be moved to a position substantially parallel therewith and caused to enter said housing when said supporting structure is moved into said housing, and a plate carried by said book holder to close said opening when said book holder has been moved into said housing.

18. In a book supporting apparatus, a base, a housing mounted on said base for vertical movement with relation thereto and having an opening in the side wall thereof, operable means to retain said housing in its vertically adjusted position, a supporting structure pivotally mounted at one end on said housing for movement through said opening into and out of said housing, and a book holder mounted on the other end of said supporting structure for movement through said opening into and out of said housing with said supporting structure, said supporting structure and said book holder being vertically adjustable with said housing in any position with relation thereto.

19. In a book supporting apparatus, a supporting structure, a book holder carried by said supporting structure and comprising an upright member, arms extending laterally from said upright member, leaf engaging devices carried by said arms, a retaining finger supported at one end only on said upright member, said finger extending lengthwise of said upright member and being movable transversely to said upright member toward and from the same, said finger being arranged to engage an open book on said book holder at the hinge and between adjacent leaves thereof, and means for moving said finger into engagement with said book and for retaining the same in such engagement.

20. In a book supporting apparatus, a supporting structure, a book holder carried by said supporting structure and comprising an upright member, arms extending laterally from said upright member, leaf engaging devices carried by said arms, a retaining finger supported at one end only on said upright member, said finger extending lengthwise of said upright member and being movable toward and from the same, said finger being arranged to engage an open book on said book holder at the hinge and between adjacent leaves thereof, spring means for moving said finger into engagement with said book, and means for retracting said finger and holding the same in its retracted position.

21. In a book supporting apparatus, a supporting structure, a book holder carried by said supporting structure and comprising an upright member, arms extending laterally from said upright member, leaf engaging devices carried by said arms, a housing substantially perpendicular to said upright member and having a longitudinal slot in a wall thereof, a device slidably and rotatably mounted in said housing, a finger carried by said device and extending through said slot, a spring acting on said device to move said finger toward said upright member, and means for retracting said device to withdraw said finger from said slot and for rotating said device to cause said finger to engage the end of said housing.

22. In a book supporting apparatus, a supporting structure, a book holder comprising a stationary upright member carried by said supporting structure, a second upright member mounted on said stationary member for movement lengthwise thereof and adapted to project above the same, means on the respective sides of said stationary member to support the lateral portions of a book on said book holder, an upwardly extending finger mounted near the lower end of said stationary member for movement transversely thereto into engagement with said book at the hinge and between the leaves thereof, and a downwardly extending finger mounted on said movable member for movement transversely thereto into engagement with said book at the hinge and between the leaves thereof, and adjustable lengthwise of said movable member.

23. In a book supporting apparatus, a supporting structure, an upright tubular member carried by said supporting structure and having a longitudinal slot in the front wall thereof, extensible arms pivotally mounted at the respective sides of said upright member and diverging forwardly therefrom, leaf engaging devices carried by said arms and adjustable lengthwise thereof, a book retaining device at the lower end of said upright member, a second tubular member slidably mounted in the first mentioned tubular member, and a book retaining device mounted on said second tubular member for adjustment lengthwise thereof and adapted to extend through the slot in the first mentioned member when said second member is in its lower position.

24. In a book supporting apparatus, a supporting structure, a book holder comprising an upright member mounted on said supporting structure for adjustment with relation thereto about both a vertical axis and a horizontal axis, forwardly diverging arms pivotally mounted on axes close to said upright member for movement in vertical planes, leaf engaging devices carried by said arms, and a book retaining device mounted adjacent to said upright member for movement into engagement with a book at the hinge and between the leaves thereof.

25. In a book supporting apparatus, a stand having a part rotatable about a vertical axis, an arm mounted on said part for movement therewith and for movement about a horizontal axis with relation thereto and projecting laterally beyond said stand, a book holder having a part pivotally mounted on said arm on a horizontal axis, said book holder comprising an upright member connected with said part for adjustment with relation thereto about both a vertical axis and a horizontal axis, arms pivotally mounted at the respective sides of said upright member and diverging forwardly therefrom, leaf engaging devices carried by said arms, and book retaining devices connected with said upright member for movement into engagement with a book at the hinge thereof.

26. In a book supporting apparatus, an upright standard, a horizontal arm pivotally mounted at one end on said stand for initial downward movement from its horizontal position to a position substantially parallel with said stand, operable means for retaining said arm in its horizontal position, a book holder mounted on said arm for movement to a position substantially parallel with said arm when the latter is parallel with said stand, said book holder comprising a normally upright member adjustable about both a vertical axis and a horizontal axis with relation thereto when said arm is in its horizontal position, laterally extending arms pivotally mounted on said upright member for adjustment in substantially vertical planes, leaf engaging devices carried by said arms, and a narrow book retaining device connected with said upright member for movement into engagement with a book at the hinge and between the leaves thereof.

GEORGE H. PROBST.